(12) United States Patent
Lo et al.

(10) Patent No.: US 7,649,855 B1
(45) Date of Patent: Jan. 19, 2010

(54) ALTERNATIVE 1000BASE-T SCRAMBLER

(75) Inventors: William Lo, Cupertino, CA (US); Francis Campana, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 1025 days.

(21) Appl. No.: 10/861,802

(22) Filed: Jun. 4, 2004

Related U.S. Application Data (60) Provisional application No. 60/532,330, filed on Dec. 22, 2003.

(51) Int. Cl.
*H04B 7/005* (2006.01)
*G06F 15/177* (2006.01)
*G01R 31/28* (2006.01)

(52) U.S. Cl. .................. 370/278; 709/222; 714/712
(58) Field of Classification Search .................. 714/704, 714/705, 709, 712, 713, 714, 715, 716, 717
See application file for complete search history.

(56) References Cited

U.S. PATENT DOCUMENTS

| | | | |
|---|---|---|---|
| 4,807,161 A * | 2/1989 | Comfort et al. ............. 702/121 |
| 5,488,661 A * | 1/1996 | Matsui ......................... 380/29 |
| 6,738,935 B1 * | 5/2004 | Kimmitt ...................... 714/701 |
| 6,823,483 B1 * | 11/2004 | Creigh ......................... 714/701 |
| 7,068,611 B2 * | 6/2006 | Bui .............................. 370/252 |
| 7,362,864 B2 * | 4/2008 | Kryzak et al. ............... 380/268 |
| 2004/0252644 A1 * | 12/2004 | Constantinescu ........... 370/242 |
| 2005/0058187 A1 * | 3/2005 | Groen et al. ................ 375/219 |

* cited by examiner

*Primary Examiner*—Kevin L Ellis
*Assistant Examiner*—Daniel F McMahon (57) ABSTRACT

A physical coding sublayer (PCS) device includes a first data scrambler, a second data scrambler, and a selector. The first data scrambler scrambles first data and implements a first scrambling cycle. The second data scrambler scrambles second data and implements a second scrambling cycle. The second data is different than the first data. The second scrambling cycle is shorter than the first scrambling cycle. The selector selects the first data scrambler to scramble the first data during normal operations. The selector selects the second data scrambler to scramble the second data during testing. The first data scrambler does not scramble the second data. The second data scrambler does not scramble the first data.

69 Claims, 7 Drawing Sheets

ALTERNATIVE 1000BASE-T SCRAMBLER

CROSS-REFERENCE TO RELATED APPLICATIONS

This application claims the benefit of U.S. Provisional Application No. 60/532,330, filed on Dec. 22, 2003, which is hereby incorporated by reference in its entirety.

FIELD OF THE INVENTION

The present invention relates to testing systems for network devices, and more particularly to testing systems for Gigabit Ethernet network devices.

BACKGROUND OF THE INVENTION

Ethernet network devices are typically tested following manufacture to verify proper operation. For example, an Ethernet network device may be required to have less than a minimum number of cyclic redundancy check (CRC) errors, symbol errors, and/or false carriers when a known signal is transmitted to the device. Automatic testing equipment (ATE) systems may be employed to perform network device testing. The ATE system typically includes another network device and/or a signal generator that transmits data to and receives data from the Ethernet network device.

Figure 1:
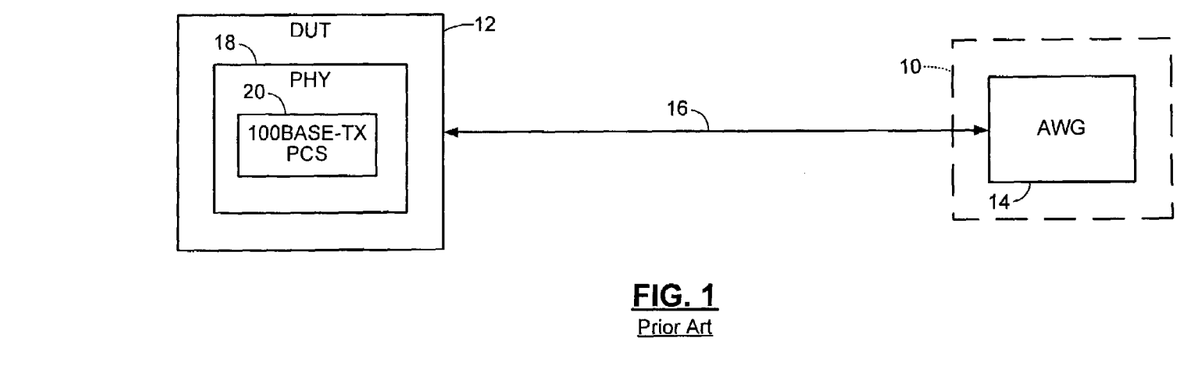
FIG. 1 is a functional block diagram of an automatic testing equipment (ATE) system with an arbitrary waveform generator (AWG) that verifies proper operation of an Ethernet network device with a PCS device that is compliant with IEEE 100BASE-TX according to the prior art.

Referring to FIG. 1, an ATE system 10 transmits/receives data to/from a device under test (DUT) 12. In an exemplary embodiment, the ATE system 10 includes an arbitrary waveform generator (AWG) 14 and the DUT 12 is an Ethernet network device 12. A data communications medium 16 connects the AWG 14 to the Ethernet network device 12. For example, the data communications medium may be cable including two or four pairs of twisted wire or another suitable medium. While the ATE system 10 tests the Ethernet network device 12, the AWG 14 is capable of emulating different lengths of the data communications medium 16. For example, the AWG 14 may store programs for different data communications medium 16 lengths. A first program may test the Ethernet network device 12 with an emulated 50 m data communications medium 16, and a second program may test the Ethernet network device 12 with an emulated 100 m data communications medium 16. Still other cable lengths may be used. This enables the ATE system 10 to test the Ethernet network device 12 over a wide range of conditions.

The Ethernet network device 12 includes a physical layer device 18 that controls access to the data communications medium 16. The physical layer device 18 includes devices that are specific to a desired communications architecture. For example, the physical layer device 18 in FIG. 1 is compliant with IEEE 100BASE-TX. The physical layer device 18 includes a physical coding sublayer (PCS) device 20, which acts as an interface between a medium independent interface (MII) and a physical medium attachment (PMA). The PCS device 20 typically includes an encoder/decoder that formats data. The PCS device 20 also typically includes a data scrambler that performs line balancing and ensures that there is sufficient transition density in data that is transmitted to the AWG 14. For example, the data scrambler may reduce electromagnetic interference by randomizing the transmitted data.

The data scrambler implements one or more scrambling cycles that are defined by polynomials. Each scrambling cycle includes a limited number of bit combinations. The recurring bit combinations are used to scramble data that is transmitted by the Ethernet network device 12. For example, the data scrambler may include a master scrambling cycle and a slave scrambling cycle. The master scrambling cycle is used when the Ethernet network device 12 initiates communications with the AWG 14. The slave scrambling cycle is used when the AWG 14 initiates communications with the Ethernet network device 12.

During a testing operation, the AWG 14 transmits data packets to the Ethernet network device 12 and determines whether the packets are successfully received by the Ethernet network device 12. Corrective action may be taken when the Ethernet network device 12 has a minimum number of packet errors. The AWG 14 simultaneously receives data from the Ethernet network device 12 to simulate two-way communications. For example, the AWG 14 may transmit a stored testing sequence that includes idle symbols to emulate a desired length of the data communications medium 16.

Since the Ethernet network device 12 may not initially be prepared to receive data, the AWG 14 seamlessly loops the testing sequence. Therefore, the Ethernet network device 12 begins receiving the testing sequence once the Ethernet network device 12 is prepared to receive data. The length of the testing sequence depends on the length of the scrambling cycle that is employed by the data scrambler of the Ethernet network device 12. The length of a scrambling cycle that is used by a scrambler in a 100BASE-TX PCS device 20 is relatively short. Therefore, the testing sequence is short enough to loop and store in the AWG 14.

Figure 2:
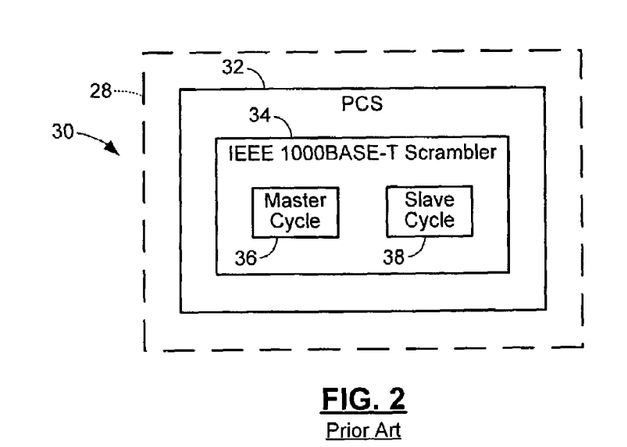
FIG. 2 is a functional block diagram of a physical layer device for an Ethernet network device with a PCS device that is compliant with IEEE 1000BASE-T according to the prior art.

Referring now to FIG. 2, conventional Ethernet network devices alternatively or additionally include Gigabit Ethernet communications architectures. A physical layer device 28 of an Ethernet network device 30 includes an PCS device 32 that is compliant with IEEE 1000BASE-T. The PCS device 32 includes a data scrambler 34 with a master scrambling cycle 36 and a slave scrambling cycle 38. The master and slave scrambling cycles 36 and 38, respectively, are set according to IEEE standards. For example, the IEEE 1000BASE-T master scrambling cycle 36 implements the polynomial $x^{33}+x^{13}+1$. The IEEE 1000BASE-T slave scrambling cycle 38 implements the polynomial $x^{33}+x^{20}+1$.

Figure 3A:
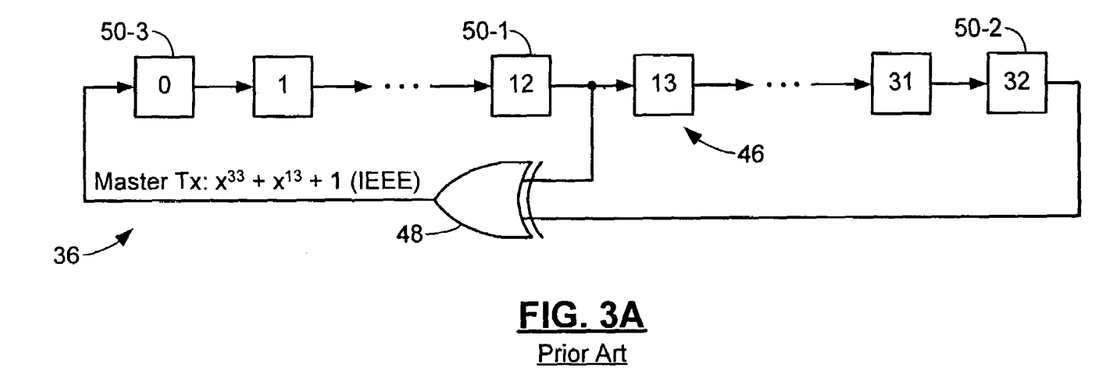
FIG. 3A is a functional block diagram of the master scrambling cycle of FIG. 2 according to the prior art.
Figure 3B:
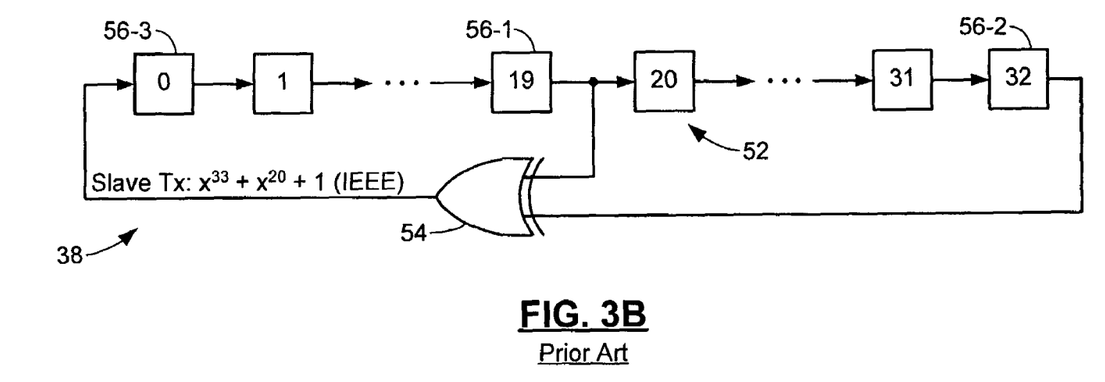
FIG. 3B is a functional block diagram of the slave scrambling cycle of FIG. 2 according to the prior art.

Referring now to FIGS. 3A and 3B, the master and slave scrambling cycles 36 and 38, respectively, include 33-bit outputs. For example, the data scrambler 34 may utilize linear feedback shift registers (LFSRs) with side-stream scrambler (SSR) functions to generate scrambler outputs. In FIG. 3A, the master scrambling cycle 36 is implemented by an LFSR 46. After each cycle time, bits are shifted one bit position to the right. An exclusive-OR (XOR) gate 48 performs an XOR operation on previous bits from the $12^{th}$ and $32^{nd}$ bit positions 50-1 and 50-2, respectively. An output of the XOR gate 48 replaces the $0^{th}$ bit position 50-3 for the next cycle. The output of the data scrambler 34 is a 33-bit number that includes current values of the 33 bit positions.

In FIG. 3B, the slave scrambling cycle 38 is also implemented by an LFSR 52. However, an XOR gate 54 performs an XOR operation on previous bits from the $19^{th}$ and $32^{nd}$ bit positions 56-1 and 56-2, respectively. The output of the XOR gate 54 replaces the $0^{th}$ bit position 56-3 for the next cycle. Since an ATE and DUT simultaneously transmit data to each other during testing, it is desirable for the master and slave scrambling cycles 36 and 38, respectively, to be different. This keeps the signals uncorrelated.

Both the master and slave scrambling cycles 36 and 38, respectively, repeat after $2^{33}-1=8,589,934,591$ cycles. The reason that the patterns do not repeat after 8,589,934,592 cycles is because a pattern of all 0's is not allowed according to IEEE standards. For example, when symbols are separated by 8 nanoseconds, the bit pattern repeats after approximately 68.72 seconds. An AWG is not typically able to store and loop a testing pattern of this size. Therefore, due to the length of the scrambling cycles, an AWG is not typically used to test an Ethernet network device with a PCS device 32 that is compliant with IEEE 1000BASE-T.

Figure 4:
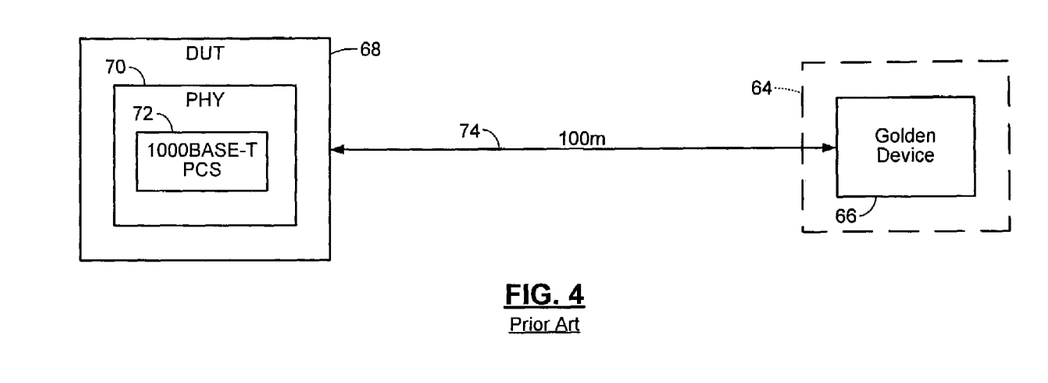
FIG. 4 is a functional block diagram of an ATE system with a golden device that verifies proper operation of an Ethernet network device with a PCS device that is compliant with 1000BASE-T according to the prior art.

Referring now to FIG. 4, in one conventional method, an ATE system 64 includes a golden device 66 and is used to test an Ethernet network device 68. A golden device 66 is a device that is known to operate properly before a testing operation so that failures occurring during a testing operation are automatically attributable to the device under test 68. The Ethernet network device 68 includes a physical layer device 70 with a PCS device 72 that is compliant with 1000BASE-T. The golden device 66 may scale down a data rate of the Ethernet network device 68 and scale up a data rate of the ATE system 64 so that the rates match. For example, the golden device 66 may employ multiplexing/demultiplexing hardware. A data communications medium 74 connects the golden device 66 and the Ethernet network device 68. However, unlike an AWG, the golden device 66 does not emulate different lengths of the data communications medium 74. Therefore, data communications media of different lengths are required to simulate data communications across network connections of different lengths. This is both time consuming and expensive.

Typically, the Ethernet network device 68 is only tested with a data communications medium 74 having a length that is equal to a maximum distance that the Ethernet network device 68 reliably transmits/receives data. For example, a 100 m data communications medium 74 is typically used to test an Ethernet network device 68 with a PCS device 72 that is compliant with 1000BASE-T. This prevents a user from determining differences in analog sensitivity between data communications media of different lengths and significantly limits the range of conditions under which the Ethernet network device 68 may be tested.

SUMMARY OF THE INVENTION

A physical coding sublayer (PCS) device and method according to the present invention includes a first data scrambler that implements a first scrambling cycle. A second data scrambler implements a second scrambling cycle. The second scrambling cycle is shorter than the first scrambling cycle. A selector selects the first data scrambler during normal operations and the second data scrambler during testing operations.

In other features, the first and second data scramblers implement third and fourth scrambling cycles. The fourth scrambling cycle is shorter than the third scrambling cycle. The selector selects one of the first and third scrambling cycles when in a master state and one of the second and fourth scrambling cycles when in a slave state. An Ethernet network device comprises the PCS device. The Ethernet network device generates a control signal that indicates a link status of the Ethernet network device. A system comprises the Ethernet network device and an error counter that communicates with the Ethernet network device and that receives the control signal. The Ethernet network device increments the error counter when the link status indicates that the Ethernet network device experiences an error condition.

In still other features of the invention, a system comprises an Ethernet network device that includes the PCS device and also comprises an automatic testing equipment (ATE) system that communicates with the Ethernet network device and that verifies proper operation of the Ethernet network device. The Ethernet network device generates a control signal that indicates a link status of the Ethernet network device. The ATE system receives the control signal and transmits at least one predetermined symbol pattern to the Ethernet network device based on the link status. The first and second data scramblers are side-stream scramblers that include linear feedback shift registers (LFSRs). First and second polynomial functions determine lengths of the first and second scrambling cycles, respectively. The first data scrambler implements one of a master and a slave IEEE 1000BASE-T scrambler polynomial. The PCS device is compliant with IEEE 1000BASE-T, Gigabit Ethernet standards. A data communications medium has a first end that is connected to the Ethernet network device and a second end that is connected to the ATE system. The ATE system transmits data to and receives data from the Ethernet network device on the data communications medium.

In yet other features, the ATE system transmits the at least one predetermined symbol pattern to the Ethernet network device after the Ethernet network device begins transmitting data to the ATE system when the second scrambling cycle is a master cycle. The ATE system transmits a first idle symbol pattern to the Ethernet network device when the link status indicates that a link between the Ethernet network device and the ATE system is disabled and that a receive status of the Ethernet network device is negative. The ATE system transmits a first idle symbol pattern to the Ethernet network device when the link status indicates that a link between the Ethernet network device and the ATE system is disabled and that a receive status of the Ethernet network device is positive. The ATE system transmits a data symbol pattern to the Ethernet network device when the link status indicates that a link between the Ethernet network device and the ATE system is enabled and that a receive status of the Ethernet network device is positive.

In still other features of the invention, the ATE system transmits a data symbol pattern to the Ethernet network device after the first idle symbol pattern. Both of the first idle symbol pattern and the data symbol pattern include a first number of symbols. The Ethernet network device detects a continuous waveform while the ATE system seamlessly transitions between the first idle symbol pattern and the data symbol pattern. The ATE system transmits a second idle symbol pattern after the first idle symbol pattern, a data symbol pattern after the second idle symbol pattern, and the second idle symbol pattern after the data symbol pattern to the Ethernet network device. A beginning and an end of the data symbol pattern includes idle symbols. The ATE system includes an arbitrary waveform generator (AWG) that emulates at least one alternative length of the data communications medium during the testing operations. The idle symbols simulate a signal propagation delay for a maximum length of a data communications medium that connects the Ethernet network device and the ATE system.

In yet other features, the first and second idle symbol patterns and the data symbol pattern all include a first number of symbols. The Ethernet network device detects a continuous waveform while the ATE system seamlessly transitions between at least two of the first and second idle symbol patterns and the data symbol pattern. The Ethernet network device detects a continuous waveform while the ATE system transmits at least two predetermined symbol patterns to the Ethernet network device and while the ATE system seamlessly transitions between the at least two predetermined symbol patterns. The ATE system interrogates at least one of a register and a pin of the Ethernet network device to determine whether the Ethernet network device experiences an error condition while the ATE system transmits the at least one predetermined symbol pattern. The Ethernet network device and the ATE system simultaneously transmit and receive data on the data communications medium.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term device refers to an application specific integrated circuit (ASIC), an electronic circuit, a processor (shared, dedicated, or group) and memory that execute one or more software or firmware programs, a combinational logic circuit, or other suitable components that provide the described functionality.

Figure 5:
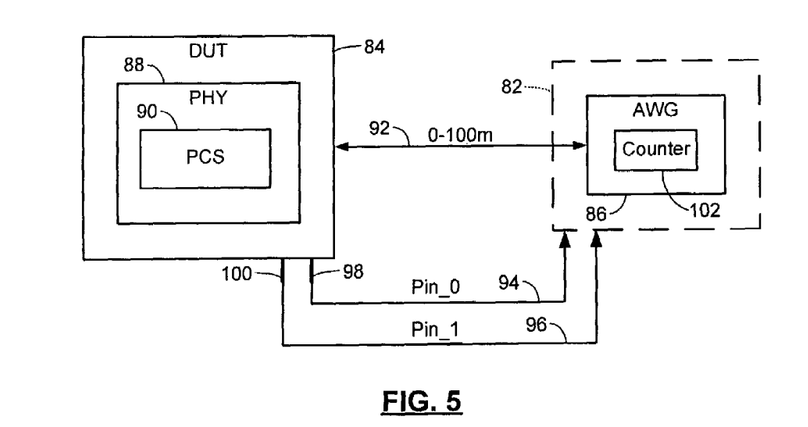
FIG. 5 is a functional block diagram of an ATE system with an AWG that verifies proper operation of an Ethernet network device according to the present invention.

Referring now to FIG. 5, an automatic testing equipment (ATE) system 82 transmits/receives data to/from a device under test (DUT) 84 to verify proper operation of the DUT 84. The DUT 84 is an Ethernet network device 84, and the ATE system 82 includes an arbitrary waveform generator (AWG) 86. A physical layer device 88 in the Ethernet network device 84 includes a physical coding sublayer (PCS) device 90. A data communications medium 92 connects the AWG 86 and the Ethernet network device 84. For example, the data communications medium 92 may be cable that includes two or four pairs of twisted wire or another suitable medium. The AWG 86 emulates different lengths of the data communications medium 92 during testing processes.

The Ethernet network device 84 outputs first and second control signals 94 and 96, respectively, from first and second pins 98 and 100 (Pin_0 and Pin_1, respectively) to indicate an operational state of the Ethernet network device 84 during testing. The ATE system 82 receives the first and second control signals 94 and 96, respectively, and the AWG 86 transmits a testing symbol pattern based on values of the first and second control signals 94 and 96, respectively. The AWG 86 includes a counter 102 that is incremented when values of the first and second control signals 94 and 96, respectively, indicate that the Ethernet network device 84 has cyclic redundancy check (CRC) errors, symbol errors, and/or false carriers.

Figure 6:
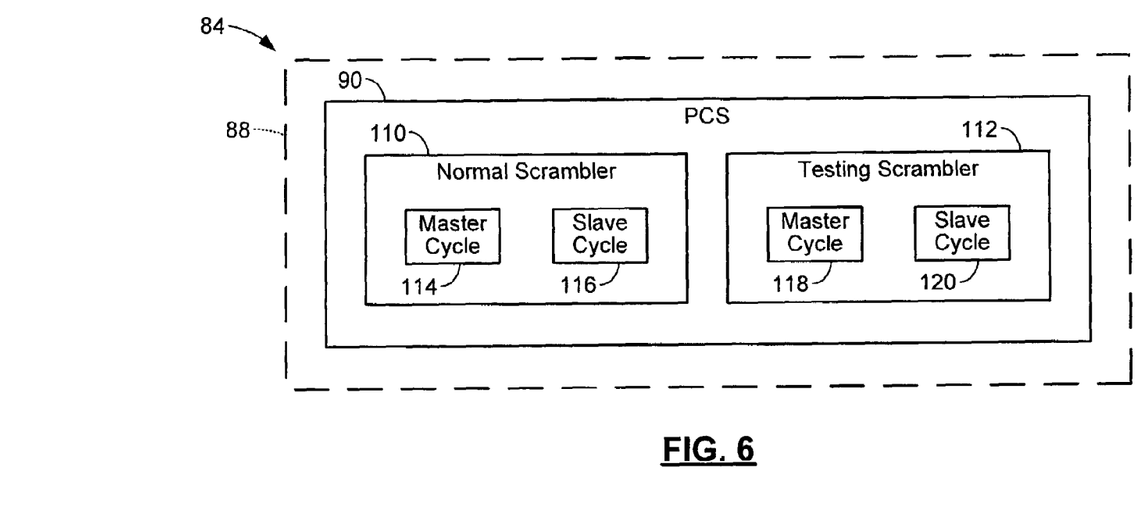
FIG. 6 is a functional block diagram of the physical layer device in FIG. 5 including a first data scrambler for normal operations and a second data scrambler for testing operations.

Referring now to FIG. 6, the PCS device 90 includes first and second data scramblers, 110 and 112, respectively. The PCS device 90 employs the first data scrambler 110 during normal operations and the second data scrambler 112 during testing operations. Both the first and second data scramblers 110 and 112 include master and slave scrambling cycles 114 and 116, and 118 and 120, respectively. For example, the master and slave scrambling cycles 114 and 116, respectively, of the first data scrambler may be compliant with IEEE 1000BASE-T.

The master and slave scrambling cycles 118 and 120, respectively, of the second data scrambler 112 generate cycle patterns that are much shorter than the master and slave scrambling cycles 114 and 116, respectively, of the first data scrambler 110. This allows the AWG 86 to store and loop a testing symbol pattern for the Ethernet network device 84. While the first and second data scramblers 110 and 112, respectively, and their respective scrambling cycles 114 and 116, and 118 and 120 are shown as separate devices, those skilled in the art can appreciate that all of the scrambling cycles 114, 116, 118, and 120 may be run as stored programs from a single memory location. Alternatively, the scrambling cycles 118 and 120 of the second data scrambler 112 may be generated by a circuit that is external to the Ethernet network device 84 during testing. The second data scrambler 112 is preferably compliant with IEEE 1000BASE-T and future standards.

Figure 7A:
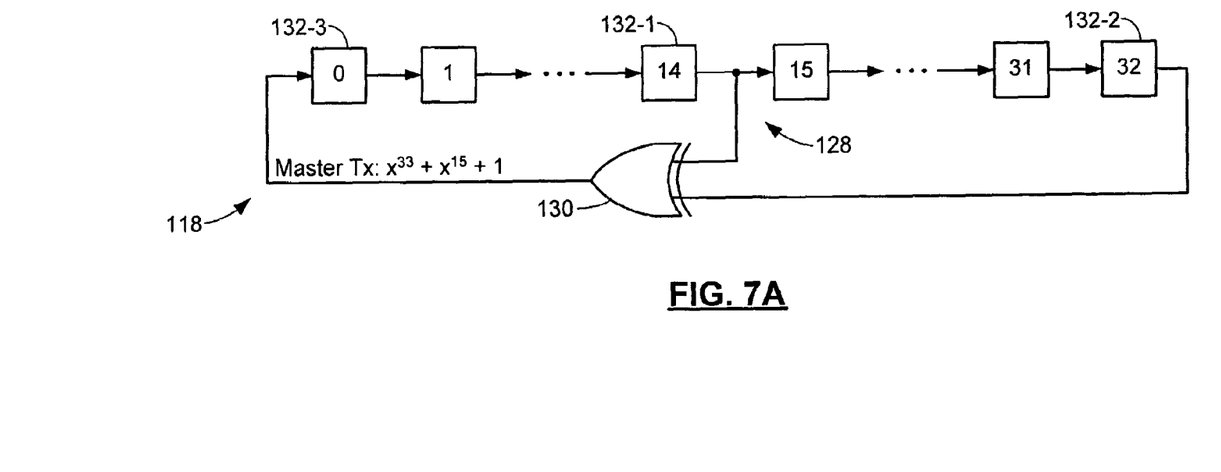
FIG. 7A is a functional block diagram of a master scrambling cycle that is implemented by the second data scrambler in FIG. 6.
Figures 7B, 8:
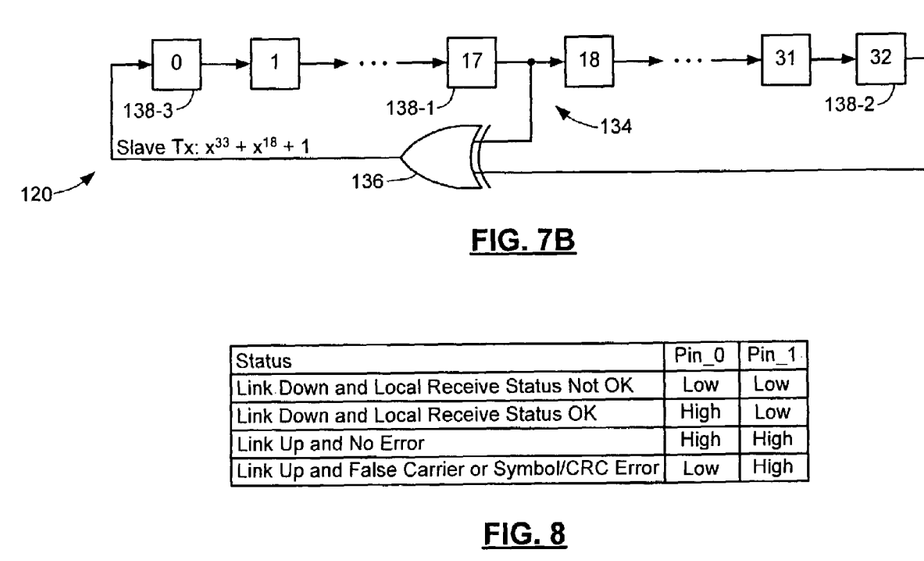
FIG. 7B is a functional block diagram of a slave scrambling cycle that is implemented by the second data scrambler in FIG. 6.
FIG. 8 is a table that illustrates control signal combinations that indicate an operating state of the Ethernet network device.

Referring now to FIGS. 7A and 7B, the master and slave scrambling cycles 118 and 120, respectively, of the second data scrambler 112 generate 33-bit outputs. In an exemplary embodiment, the master and slave scrambling cycles 118 and 120, respectively, of the second data scrambler 112 are implemented with linear feedback shift registers (LFSRs). The length of a scrambling cycle in a data scrambler may be adjusted by changing a feedback path. This adjusts the polynomial that a particular scrambling cycle implements.

By changing the typical feedback paths of an IEEE 1000BASE-T data scrambler, the master scrambling cycle 118 of the second data scrambler 112 implements the polynomial $x^{33}+x^{15}+1$. The slave scrambling cycle 120 of the second data scrambler 112 implements the polynomial $x^{33}+x^{18}+1$. The master and slave scrambling cycles 118 and 120, respectively, are different so that signals between the AWG 86 and the Ethernet network device 84 are uncorrelated.

In FIG. 7A, the master scrambling cycle 118 is generated by an exemplary LFSR 128. After each cycle time, bits are shifted one bit position to the right. An exclusive-OR (XOR) gate 130 performs an XOR operation on previous bits from the $14^{th}$ and $32^{nd}$ bit positions 132-1 and 132-2, respectively. An output of the XOR gate 130 replaces the $0^{th}$ bit position 132-3 for the next cycle. The output of the second data scrambler 112 is a 33-bit number that includes current values of the 33 bit positions. In FIG. 7B, the slave scrambling cycle 120 of the second data scrambler 112 is also implemented by an exemplary LFSR 134. However, an XOR gate 136 performs an XOR operation on previous bits from the $17^{th}$ and $32^{nd}$ bit positions 138-1 and 138-2, respectively. The output of the XOR gate 136 replaces the $0^{th}$ bit position 138-3 for the next cycle.

Both the master and slave scrambling cycles 118 and 120, respectively, of the second data scrambler 112 repeat after 1,785 cycles, as compared to after 8,589,934,591 cycles with an IEEE 1000BASE-T data scrambler. This assumes that the second data scrambler 112 is always initialized with a value that is included in the 1,785 values of the scrambling cycles 118 and 120. For example, the second data scrambler 112 may be initialized with a pattern of all 1's during testing processes. This is important because all possible combinations of the second data scrambler 112 are not utilized during testing. Therefore, to ensure that the scrambling cycles 118 and 120 repeat after 1,785 cycles, the scrambling cycles 118 and 120 always begin and operate in the same recurring loop during testing processes. The shorter scrambling cycles 118 and 120 allow the AWG 86 to store and loop a testing symbol pattern during testing processes.

Referring now to FIG. 8, during conventional testing processes, ATE systems typically include a digital signal processor (DSP) that communicates with a DSP in the Ethernet network device 84. The two DSPs communicate and include embedded code as part of a start-up routine. The embedded code allows a first DSP to inform a second DSP whether or not a receive status of the first DSP is affirmative. A testing process will not proceed as long as a local receive status of one of the DSPs is negative. The AWG 86 does not include a DSP to communicate with the DSP in the Ethernet network device 84. Therefore, the AWG 86 relies on the first and second control signals 94 and 96, respectively, from the Ethernet network device 84 to know when the DSP in the Ethernet network device 84 begins successfully receiving symbols.

Once the Ethernet network device 84 acknowledges that symbols have been successfully received, the AWG 86 can begin emulating that it has received symbols from the Ethernet network device 84. The first and second control signals 94 and 96, respectively, are output from the first and second pins 98 and 100 (Pin_0 and Pin_1, respectively) of the Ethernet network device 84. The AWG 86 receives the first and second control signals 94 and 96, respectively, and determines an operational state of the Ethernet network device 84 based on values of the first and second control signals 94 and 96, respectively.

The table in FIG. 8 defines the operational status of the Ethernet network device 84 based on values of the first and second control signals 94 and 96, respectively. When both the first and second control signals 94 and 96, respectively, are set low, a link between the Ethernet network device 84 and the AWG 86 is disabled and the local receive status of the Ethernet network device 84 is negative. When the first control signal 94 is set high and the second control signal 96 is set low, the link between the Ethernet network device 84 and the AWG 86 is disabled and the local receive status of the Ethernet network device 84 is affirmative. When both the first and second control signals 94 and 96, respectively, are set high, the link between the Ethernet network device 84 and the AWG 86 is enabled and the Ethernet network device 84 has not detected symbol errors.

When the first control signal 94 is set low and the second control signal 96 is set high, the link between the Ethernet network device 84 and the AWG 86 is enabled and the Ethernet network device 84 has detected symbol errors. The first control signal 94 that is output by the first pin 98 is preferably stretched low long enough for the ATE system 82 to have loose sampling when the Ethernet network device 84 detects a symbol error. For example, the first control signal 94 may be stretched low for 24 nanoseconds. Additionally, the symbol error condition is preferably communicated to the AWG 86 once after each symbol error is detected.

Figure 9:
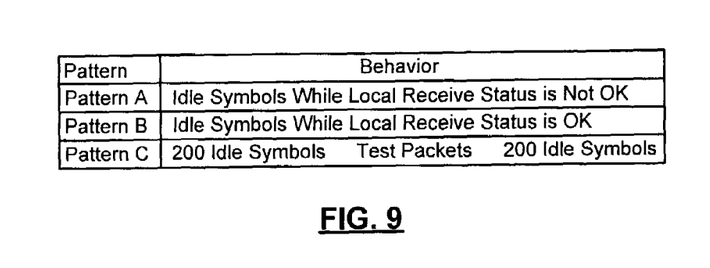
FIG. 9 is a table that illustrates the composition of symbol patterns that the AWG transmits to test the Ethernet network device.

Referring now to FIG. 9, a table defines the testing symbol patterns that the AWG 86 transmits to the Ethernet network device 84 during the testing process. There are three different exemplary symbol patterns. The symbol patterns are designed so that the AWG 86 can seamlessly transition between the different symbol patterns. While three exemplary symbol patterns are identified in FIG. 9, the AWG 86 may also transmit other symbol patterns that have different configurations. Data is typically processed 8 bits at a time, and the scrambling cycles of the second data scrambler 112 include 1,785 cycles. The smallest multiple of 1,785 bits that is divisible by 8 bits is equal to 8×1,785=1,785 symbols. However, symbols are generated by an encoder that compares even and odd bytes. Therefore, the shortest symbol pattern length that allows for seamless transitions between the different symbol patterns is 1,785×2=3,570 symbols.

Pattern A is a first idle symbol pattern that includes 3,570 idle symbols. The AWG 86 transmits Pattern A to the Ethernet network device 84 while the link between the AWG 86 and the Ethernet network device 84 is disabled and the local receive status of the Ethernet network device 84 is negative. Pattern B is a second idle symbol pattern that includes 3,570 idle symbols. The AWG 86 transmits Pattern B to the Ethernet network device 84 while the link between the Ethernet network device 84 and the AWG 86 is disabled and the local receive status of the Ethernet network device 84 is affirmative.

Pattern C is a data symbol pattern that includes data packets and 200 idle symbols at the beginning and end of the pattern. Pattern C is padded with idle symbols at the beginning and end so that the response of Pattern B is isolated from the response of Pattern C. The time it takes to transmit 200 idle symbols is typically equal to the propagation time of a signal across a data transmission medium that is more than 300 m. Since data communications media that are greater than 200 m are typically not used during testing, the 200 idle symbols are sufficient to isolate responses from the idle symbols and the data packets.

Figure 10A:
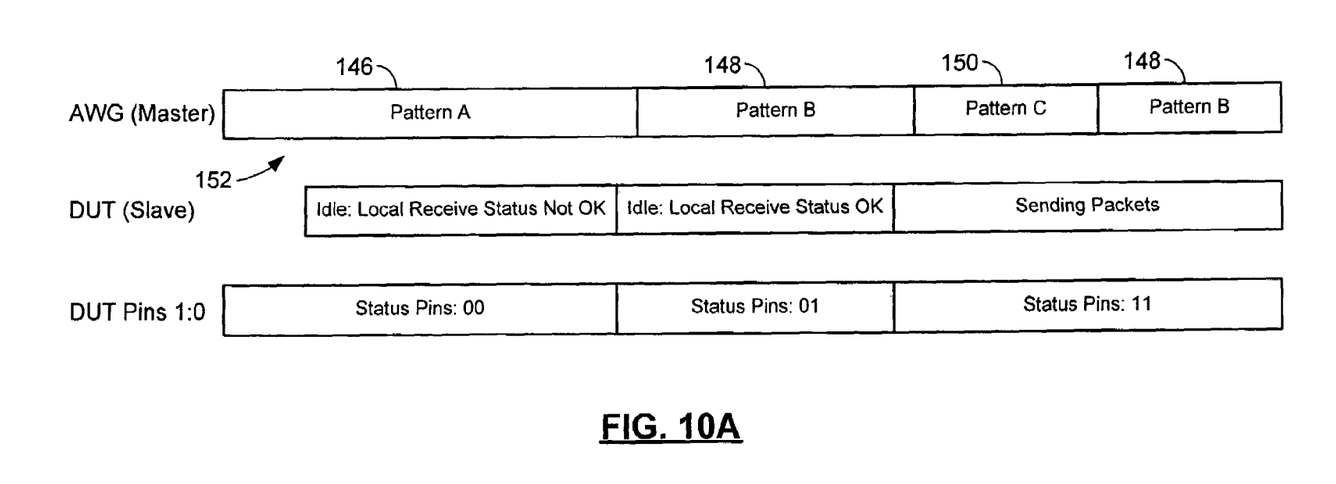
FIG. 10A illustrates a testing symbol sequence that the AWG transmits in response to an operational state of the Ethernet network device when the second data scrambler implements the slave scrambling cycle.
Figure 10B:
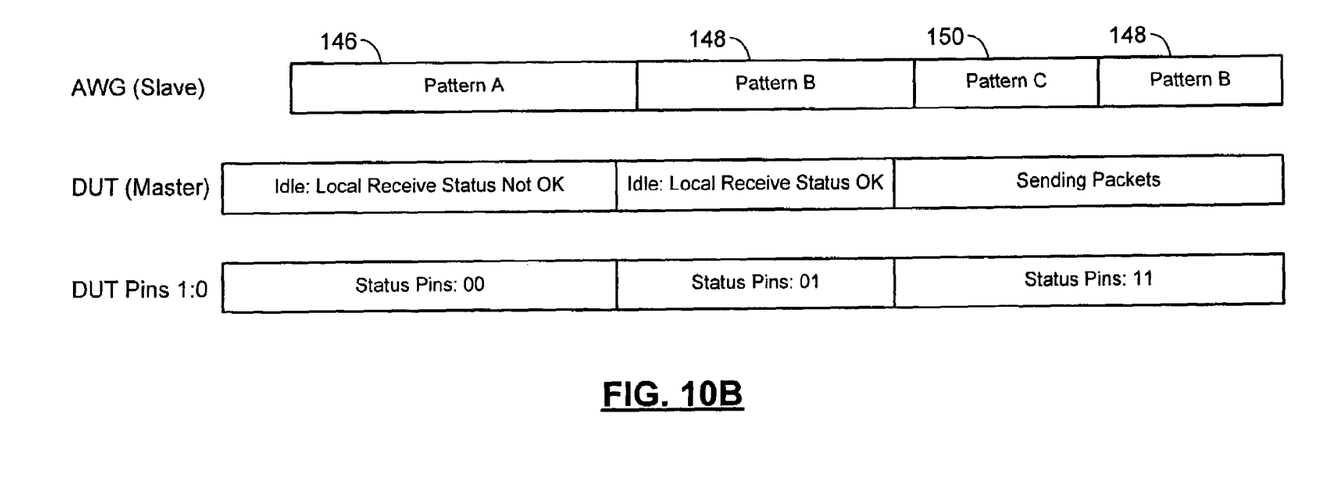
FIG. 10B illustrates a testing symbol sequence that the AWG transmits in response to an operational state of the Ethernet network device when the second data scrambler implements the master scrambling cycle.

Referring now to FIGS. 10A and 10B, operation of the AWG 86 and the Ethernet network device 84 is illustrated during an exemplary testing process. FIG. 10A illustrates a testing process when the second data scrambler 112 implements the slave scrambling cycle 120. Therefore, the AWG 86 operates as the master device. The AWG 86 begins by transmitting Pattern A 146 to the Ethernet network device 84. The AWG 86 loops Pattern A 146 while the first and second control signals 94 and 96, respectively, indicate that the local receive status of the Ethernet network device 84 is negative. Therefore, the first and second control signals 94 and 96, respectively, that are output by the first and second pins 98 and 100, respectively, are set low. Once the first and second control signals 94 and 96, respectively, indicate that the local receive status of the Ethernet network device 84 is affirmative, the AWG 86 transitions to Pattern B 148 on the next available pattern boundary. The AWG 86 loops Pattern B 148 while the first control signal 94 is set high and the second control signal 96 is set low.

Once the first and second control signals 94 and 96, respectively, indicate that the link between the AWG 86 and the Ethernet network device 84 is enabled, the AWG 86 transitions to Pattern C 150 on the next available pattern boundary. The AWG 86 loops Pattern C 150 for a predetermined time period while the first and second control signals 94 and 96, respectively, are set high. While the AWG 86 loops Pattern C 150, the ATE system 82 may monitor the first and second control signals 94 and 96, respectively, to determine when the Ethernet network device 84 detects symbol errors. When a symbol error is detected, the ATE system 82 increments the counter 102 in the AWG 86. The ATE system 82 may take corrective actions and/or cease the testing process when the value of the counter 102 is greater than a predetermined count.

Alternatively or additionally, the Ethernet network device 84 includes a CRC counter. In this case, after looping Pattern C 150 for the predetermined time, the AWG 86 may transition back to Pattern B 148 as shown in FIG. 10A. While the AWG 86 loops Pattern B 148, the ATE system 82 can interrogate the CRC counter in the Ethernet network device 84 to determine whether the Ethernet network device 84 has symbol errors. In the event that the ATE system 82 does not interrogate registers of the Ethernet network device 84, the AWG 86 does not need to transition back to Pattern B 148 at the end of the testing symbol sequence 152. The ATE system 82 may also receive control signals from other pins of the Ethernet network device 84 to detect CRC errors.

The symbol pattern lengths and the idle symbols in Pattern C 150 allow the AWG 86 to seamlessly transition from Pattern A 146 to Pattern B 148, from Pattern B 148 to Patter C, and/or from Pattern B 148 to Pattern C 150. This allows the AWG 86 to effectively emulate signal propagation delays across a long data communications medium. This also allows the Ethernet network device 84 to detect a single continuous waveform from the AWG 86 during the testing process. Additionally, the Ethernet network device 84 transmits data to the AWG 86 during the testing process to simulate two-way communications. This also allows the Ethernet network device 84 to stress the hybrid and echo canceller.

FIG. 10B illustrates the testing process when the second data scrambler 112 implements the master scrambling cycle 118. In this case, the AWG 86 operates as a slave device, and the Ethernet network device 84 initiates communications with the AWG 86 device. For example, the AWG 86 may wait 10 milliseconds before transmitting Pattern A 146 to the Ethernet network device 84. Otherwise, the testing process is conducted similarly to the testing process illustrated in FIG. 10A. The AWG 86 may transmit the symbol patterns in a different order than the exemplary pattern illustrated in FIGS. 10A and 10B. The AWG 86 may also utilize a different combination of the symbol patterns. For example, the AWG 86 may only transmit Pattern B 148 followed by Pattern C 150 during a testing operation. In this case, the AWG 86 is still able to seamlessly transition between the symbol patterns. Other such combinations of symbol patterns are contemplated.

Figure 11A:
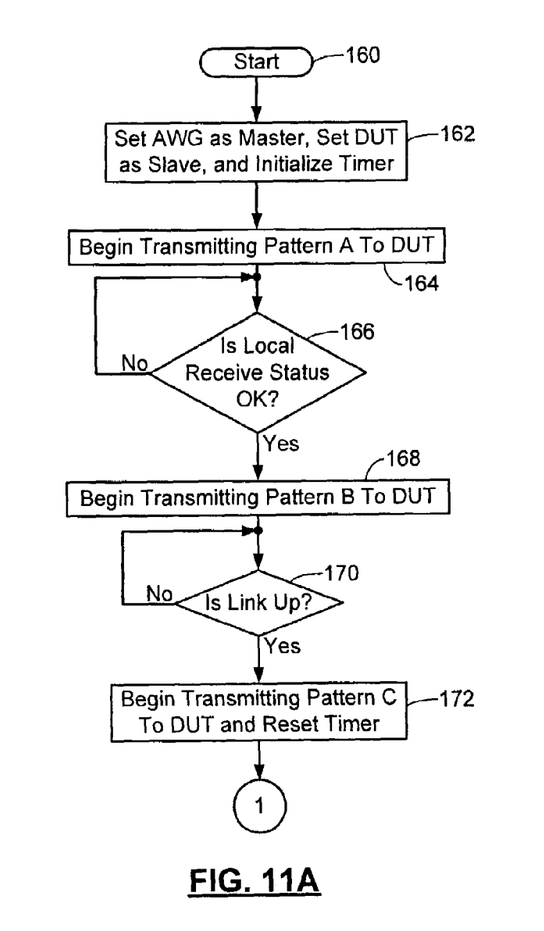
FIGS. 11A and 11B are a flowchart illustrating steps performed by the AWG to verify proper operation of the Ethernet network device when the second data scrambler implements the slave scrambling cycle.
Figure 11B:
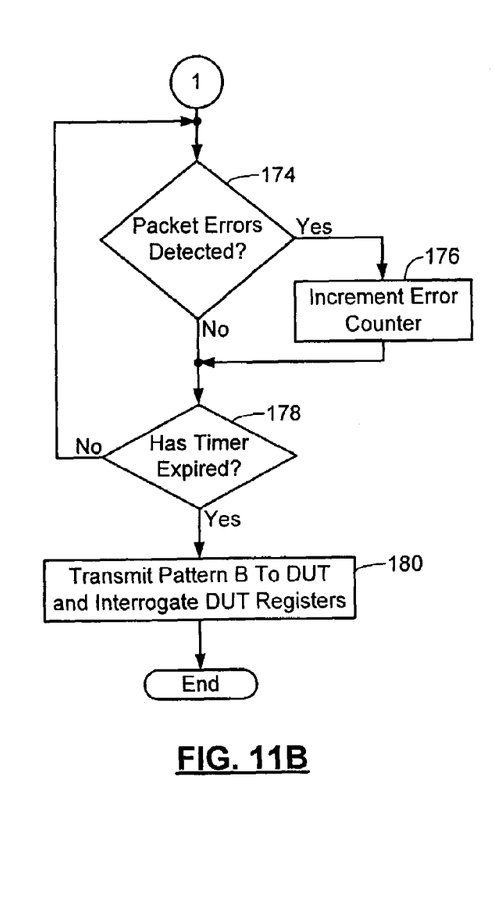

Referring now to FIGS. 11A and 11B, a testing algorithm begins in step 160. In step 162, control sets the AWG 86 as the master device and the Ethernet network device 84 as the slave device. Control also initializes a timer. The algorithm in FIGS. 11A and 11B assumes that the AWG 86 operates as the master device. Those skilled in the art can appreciate that the AWG 86 may also operate as the slave device during the testing process. In step 164, the AWG 86 begins transmitting Pattern A 146 to the Ethernet network device 84. In step 166, control determines whether the local receive status of the Ethernet network device 84 is affirmative. If false, control loops to step 166. If true, control proceeds to step 168.

In step 168, the AWG 86 begins transmitting Pattern B 148 to the Ethernet network device 84. In step 170, control determines whether the link between the AWG 86 and the Ethernet network device 84 is enabled. If false, control loops to step 170. If true, control proceeds to step 172. In step 172, the AWG 86 begins transmitting Pattern C 150 to the Ethernet network device 84 and the timer is reset. In step 174, control determines whether the first and second control signals 94 and 96, respectively, indicate that the Ethernet network device 84 detects symbol errors. If true, control proceeds to step 176. If false, control proceeds to step 178. In step 176, control increments the counter 102 in the AWG 86 and control proceeds to step 178.

In step 178, control determines whether the timer has expired. If false, control returns to step 174. If true, control proceeds to step 180. In step 180, the AWG 86 begins transmitting Pattern B 148 to the Ethernet network device 84 while the ATE system 82 interrogates one or more registers or pins of the Ethernet network device 84 and control ends. If the AWG 86 does not include a counter 102, control may take corrective action, cease the testing process, and/or perform another task in step 176. Additionally, if the ATE system 82 does not interrogate registers or pins of the Ethernet network device 84, step 180 may be omitted.

The present invention utilizes an AWG to test an Ethernet network device with a PCS device that is compliant with IEEE 1000BASE-T during normal operations. The previous memory depth limitations are avoided by utilizing shortened scrambling cycles while still remaining compatible with 1000BASE-T encoding/decoding. Therefore, an AWG can be used to emulate different lengths of a data communications medium between an ATE system and the Ethernet network device. A single data communications medium is used to test the Ethernet network device across a wide range of conditions. Additionally, a length of the data communications medium does not have to be equal to a maximum data transmission distance of the Ethernet network device.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A physical coding sublayer (PCS) device, comprising:
   a first data scrambler that scrambles first data and that implements a first scrambling cycle;
   a second data scrambler that scrambles second data that is different than said first data and that implements a second scrambling cycle, wherein said second scrambling cycle is shorter than said first scrambling cycle; and a selector that selects said first data scrambler to scramble said first data during normal operations and that selects said second data scrambler to scramble said second data during testing, wherein said first data scrambler does not scramble said second data and said second data scrambler does not scramble said first data.

2. The PCS device of claim 1 wherein:

said first and second data scramblers implement third and fourth scrambling cycles, respectively, said fourth scrambling cycle is shorter than said third scrambling cycle, and said selector selects one of said first and third scrambling cycles when in a master state, and selects one of said second and fourth scrambling cycles when in a slave state.

3. An Ethernet network device comprising the PCS device of claim 1 wherein said Ethernet network device generates a control signal that indicates a link status of said Ethernet network device.

4. A system comprising the Ethernet network device of claim 3 and further comprising an error counter that communicates with said Ethernet network device and receives said control signal, wherein said Ethernet network device increments said error counter when said link status indicates that said Ethernet network device experiences an error condition.

5. A system, comprising:

an Ethernet network device that includes the PCS device of claim 1; and an automatic testing equipment (ATE) system that communicates with said Ethernet network device and that verifies proper operation of said Ethernet network device.

6. The system of claim 5 wherein said Ethernet network device generates a control signal that indicates a link status of said Ethernet network device, and wherein said ATE system receives said control signal and transmits at least one predetermined symbol pattern to said Ethernet network device based on said link status.

7. The PCS device of claim 1 wherein said first and second data scramblers are side-stream scramblers that include linear feedback shift registers (LFSRs), and wherein first and second polynomial functions determine lengths of said first and second scrambling cycles, respectively.

8. The PCS device of claim 7 wherein said first data scrambler implements one of a master and a slave IEEE 1000BASE-T scrambler polynomial.

9. The PCS device of claim 1 wherein said PCS device is compliant with IEEE 1000BASE-T Gigabit Ethernet standards.

10. The system of claim 5 further comprising a data communications medium with a first end that is connected to said Ethernet network device and a second end that is connected to said ATE system, wherein said ATE system transmits data to and receives data from said Ethernet network device on said data communications medium.

11. The system of claim 6 wherein said ATE system transmits said at least one predetermined symbol pattern to said Ethernet network device after said Ethernet network device begins transmitting data to said ATE system when said second scrambling cycle is a master cycle.

12. The system of claim 6 wherein said ATE system transmits a first idle symbol pattern to said Ethernet network device when said link status indicates:

that a link between said Ethernet network device and said ATE system is disabled; and that a receive status of said Ethernet network device is negative.

13. The system of claim 6 wherein said ATE system transmits a first idle symbol pattern to said Ethernet network device when said link status indicates:

that a link between said Ethernet network device and said ATE system is disabled; and that a receive status of said Ethernet network device is positive.

14. The system of claim 6 wherein said ATE system transmits a data symbol pattern to said Ethernet network device when said link status indicates:

that a link between said Ethernet network device and said ATE system is enabled; and that a receive status of said Ethernet network device is positive.

15. The system of claim 13 wherein:

said ATE system transmits a data symbol pattern to said Ethernet network device after said first idle symbol pattern, both of said first idle symbol pattern and said data symbol pattern include a first number of symbols, and said Ethernet network device detects a continuous waveform while said ATE system transitions between said first idle symbol pattern and said data symbol pattern.

16. The system of claim 12 wherein said ATE system transmits:

a second idle symbol pattern after said first idle symbol pattern, a data symbol pattern after said second idle symbol pattern, and said second idle symbol pattern after said data symbol pattern to said Ethernet network device.

17. The system of claim 14 wherein a beginning and an end of said data symbol pattern includes idle symbols.

18. The system of claim 10 wherein said ATE system includes an arbitrary waveform generator (AWG) that emulates at least one alternative length of said data communications medium during said testing operations.

19. The system of claim 17 wherein said idle symbols simulate a signal propagation delay for a maximum length of a data communications medium that connects said Ethernet network device and said ATE system.

20. The system of claim 16 wherein said first and second idle symbol patterns and said data symbol pattern all include a first number of symbols, and wherein said Ethernet network device detects a continuous waveform while said ATE system transitions between at least two of said first and second idle symbol patterns and said data symbol pattern.

21. The system of claim 6 wherein said Ethernet network device detects a continuous waveform:

while said ATE system transmits at least two predetermined symbol patterns to said Ethernet network device, and while said ATE system transitions between said at least two predetermined symbol patterns.

22. The system of claim 6 wherein said ATE system interrogates at least one of a register and a pin of said Ethernet network device to determine whether said Ethernet network device experiences an error condition while said ATE system transmits said at least one predetermined symbol pattern.

23. The system of claim 10 wherein said Ethernet network device and said ATE system simultaneously transmit and receive data on said data communications medium.

24. A physical coding sublayer (PCS) device, comprising:
first data scrambling means for implementing a first scrambling cycle and for scrambling first data;
second data scrambling means for implementing a second scrambling cycle and for scrambling second data that is different than said first data, wherein said second data scrambling means is different than said first data scrambling means, and wherein said second scrambling cycle is shorter than said first scrambling cycle; and
selecting means for selecting said first data scrambling means for scrambling said first data during normal operations and said second data scrambling means for scrambling said second data during testing,
wherein said first data scrambling means does not scramble said second data and said second data scrambling means does not scramble said first data.

25. The PCS device of claim 24 wherein:
said first data scrambling means and said second data scrambling means implement third and fourth scrambling cycles, respectively,
said fourth scrambling cycle is shorter than said third scrambling cycle, and
said selecting means selects one of said first and third scrambling cycles when in a master state, and selects one of said second and fourth scrambling cycles when in a slave state.

26. An Ethernet network device comprising the PCS device of claim 24 wherein said Ethernet network device generates signaling means for indicating a link status of said Ethernet network device.

27. A system comprising the Ethernet network device of claim 26 and further comprising error counting means for indicating a number of data communications errors and that communicates with said Ethernet network device and receives said signaling means, wherein said Ethernet network device increments said error counting means when said link status indicates that said Ethernet network device experiences an error condition.

28. A system, comprising:
Ethernet networking means for conducting data communications on a network that includes the PCS device of claim 24; and
automatic testing means for verifying proper operation of electronic devices that communicates with said Ethernet networking means and that verifies proper operation of said Ethernet networking means.

29. The system of claim 28 wherein said Ethernet networking means generates a control signal indicating a link status of said Ethernet networking means, and wherein said automatic testing means receives said control signal and transmits at least one predetermined symbol pattern to said Ethernet networking means based on said link status.

30. The PCS device of claim 24 wherein said first data scrambling means and said second data scrambling means are side-stream scramblers that include linear feedback shift registers (LFSRs), and wherein first and second polynomial functions determine lengths of said first and second scrambling cycles, respectively.

31. The PCS device of claim 30 wherein said first data scrambling means implements one of a master and a slave IEEE 1000BASE-T scrambler polynomial.

32. The PCS device of claim 24 wherein said PCS device is compliant with IEEE 1000BASE-T Gigabit Ethernet standards.

33. The system of claim 28 further comprising data communicating means for transmitting data with a first end that is connected to said Ethernet networking means and a second end that is connected to said automatic testing means, wherein said automatic testing means transmits data to and receives data from said Ethernet networking means on said data communicating means.

34. The system of claim 29 wherein said automatic testing means transmits said at least one predetermined symbol pattern to said Ethernet networking means after said Ethernet networking means begins transmitting data to said automatic testing means when said second scrambling cycle is a master cycle.

35. The system of claim 29 wherein said automatic testing means transmits a first idle symbol pattern to said Ethernet networking means when said link status indicates:
that a link between said Ethernet networking means and said automatic testing means is disabled; and
that a receive status of said Ethernet networking means is negative.

36. The system of claim 29 wherein said automatic testing means transmits a first idle symbol pattern to said Ethernet networking means when said link status indicates:
that a link between said Ethernet networking means and said automatic testing means is disabled; and
that a receive status of said Ethernet networking means is positive.

37. The system of claim 29 wherein said automatic testing means transmits a data symbol pattern to said Ethernet networking means when said link status indicates:
that a link between said Ethernet networking means and said automatic testing means is enabled; and
that a receive status of said Ethernet networking means is positive.

38. The system of claim 36 wherein:
said automatic testing means transmits a data symbol pattern to said Ethernet networking means after said first idle symbol pattern,
both of said first idle symbol pattern and said data symbol pattern include a first number of symbols, and
said Ethernet networking means detects a continuous waveform while said automatic testing means transitions between said first idle symbol pattern and said data symbol pattern.

39. The system of claim 35 wherein said automatic testing means transmits:
a second idle symbol pattern after said first idle symbol pattern,
a data symbol pattern after said second idle symbol pattern, and
said second idle symbol pattern after said data symbol pattern to said Ethernet networking means.

40. The system of claim 37 wherein a beginning and an end of said data symbol pattern includes idle symbols.

41. The system of claim 33 wherein said automatic testing means includes arbitrary waveform generating means for emulating at least one alternative length of said data communicating means during said testing operations.

42. The system of claim 40 wherein said idle symbols simulate a signal propagation delay for a maximum length of data communicating means for transmitting data that connects said Ethernet networking means and said automatic testing means.

43. The system of claim 39 wherein said first and second idle symbol patterns and said data symbol pattern all include a first number of symbols, and wherein said Ethernet networking means detects a continuous waveform while said automatic testing means transitions between at least two of said first and second idle symbol patterns and said data symbol pattern.

44. The system of claim 29 wherein said Ethernet networking means detects a continuous waveform:
while said automatic testing means transmits at least two predetermined symbol patterns to said Ethernet networking means, and
while said automatic testing means transitions between said at least two predetermined symbol patterns.

45. The system of claim 29 wherein said automatic testing means interrogates at least one of a register and a pin of said Ethernet networking means to determine whether said Ethernet networking means experiences an error condition while said automatic testing means transmits said at least one predetermined symbol pattern.

46. The system of claim 33 wherein said Ethernet networking means and said automatic testing means simultaneously transmit and receive data on said data communicating means.

47. A method for operating a physical coding sublayer (PCS) device, comprising:
implementing a first scrambling cycle using a first data scrambler that scrambles first data;
implementing a second scrambling cycle using a second data scrambler that is different than said first data scrambler and that scrambles second data that is different than said first data, wherein said second scrambling cycle is shorter than said first scrambling cycle; and
selecting said first scrambling cycle to scramble said first data during normal operations and said second scrambling cycle to scramble said second data during testing,
wherein said first data scrambler does not scramble said second data and said second data scrambler does not scramble said first data.

48. The method of claim 47 further comprising:
implementing third and fourth scrambling cycles, wherein said fourth scrambling cycle is shorter than said third scrambling cycle;
selecting one of said first and third scrambling cycles when in a master state; and
selecting one of said second and fourth scrambling cycles when in a slave state.

49. The method of claim 47 further comprising implementing said PCS device in an Ethernet network device that generates a control signal that indicates a link status of said Ethernet network device.

50. The method of claim 49 further comprising incrementing an error counter when said link status indicates that said Ethernet network device experiences an error condition.

51. The method of claim 47 wherein said PCS device is implemented in an Ethernet network device and wherein an automatic testing equipment (ATE) system that communicates with said Ethernet network device verifies proper operation of said Ethernet network device.

52. The method of claim 51 further comprising:
generating a control signal that indicates a link status of said Ethernet network device;
transmitting said control signal to said ATE system; and
transmitting at least one predetermined symbol pattern to said Ethernet network device based on said link status.

53. The method of claim 47 wherein said first and second data scramblers are side-stream scramblers that include linear feedback shift registers (LFSRs), and wherein first and second polynomial functions determine lengths of said first and second scrambling cycles, respectively.

54. The method of claim 53 wherein said first data scrambler implements one of a master and a slave IEEE 1000BASE-T scrambler polynomial.

55. The method of claim 47 wherein said PCS device is compliant with IEEE 1000BASE-T Gigabit Ethernet standards.

56. The method of claim 51 further comprising connecting a data communications medium to said Ethernet network device and said ATE system, wherein said ATE system transmits data to and receives data from said Ethernet network device on said data communications medium.

57. The method of claim 52 further comprising transmitting said at least one predetermined symbol pattern to said Ethernet network device after said Ethernet network device begins transmitting data to said ATE system when said second scrambling cycle is a master cycle.

58. The method of claim 52 further comprising transmitting a first idle symbol pattern to said Ethernet network device when said link status indicates:
that a link between said Ethernet network device and said ATE system is disabled; and
that a receive status of said Ethernet network device is negative.

59. The method of claim 52 further comprising transmitting a first idle symbol pattern to said Ethernet network device when said link status indicates:
that a link between said Ethernet network device and said ATE system is disabled; and
that a receive status of said Ethernet network device is positive.

60. The method of claim 52 further comprising transmitting a data symbol pattern to said Ethernet network device when said link status indicates:
that a link between said Ethernet network device and said ATE system is enabled; and
that a receive status of said Ethernet network device is positive.

61. The method of claim 59 further comprising:
transmitting a data symbol pattern to said Ethernet network device after said first idle symbol pattern,
wherein both of said first idle symbol pattern and said data symbol pattern include a first number of symbols, and
wherein said Ethernet network device detects a continuous waveform while said ATE system transitions between said first idle symbol pattern and said data symbol pattern.

62. The method of claim 58 further comprising transmitting:
a second idle symbol pattern after said first idle symbol pattern,
a data symbol pattern after said second idle symbol pattern, and
said second idle symbol pattern after said data symbol pattern to said Ethernet network device.

63. The method of claim 60 wherein a beginning and an end of said data symbol pattern includes idle symbols.

64. The method of claim 56 further comprising emulating at least one alternative length of said data communications medium with an arbitrary waveform generator (AWG) during said testing operations.

65. The method of claim 63 wherein said idle symbols simulate a signal propagation delay for a maximum length of a data communications medium that connects said Ethernet network device and said ATE system.

66. The method of claim 62 wherein said first and second idle symbol patterns and said data symbol pattern each of include a first number of symbols, and wherein said Ethernet network device detects a continuous waveform while said ATE system transitions between at least two of said first and second idle symbol patterns and said data symbol pattern.

67. The method of claim 52 wherein said Ethernet network device detects a continuous waveform:
   while said ATE system transmits at least two predetermined symbol patterns to said Ethernet network device; and
   while said ATE system transitions between said at least two predetermined symbol patterns.

68. The method of claim 52 further comprising interrogating at least one of a register and a pin of said Ethernet network device to determine whether said Ethernet network device experiences an error condition while said ATE system transmits said at least one predetermined symbol pattern.

69. The method of claim 56 wherein said Ethernet network device and said ATE system simultaneously transmit and receive data on said data communications medium.

* * * * *